Figure 1:
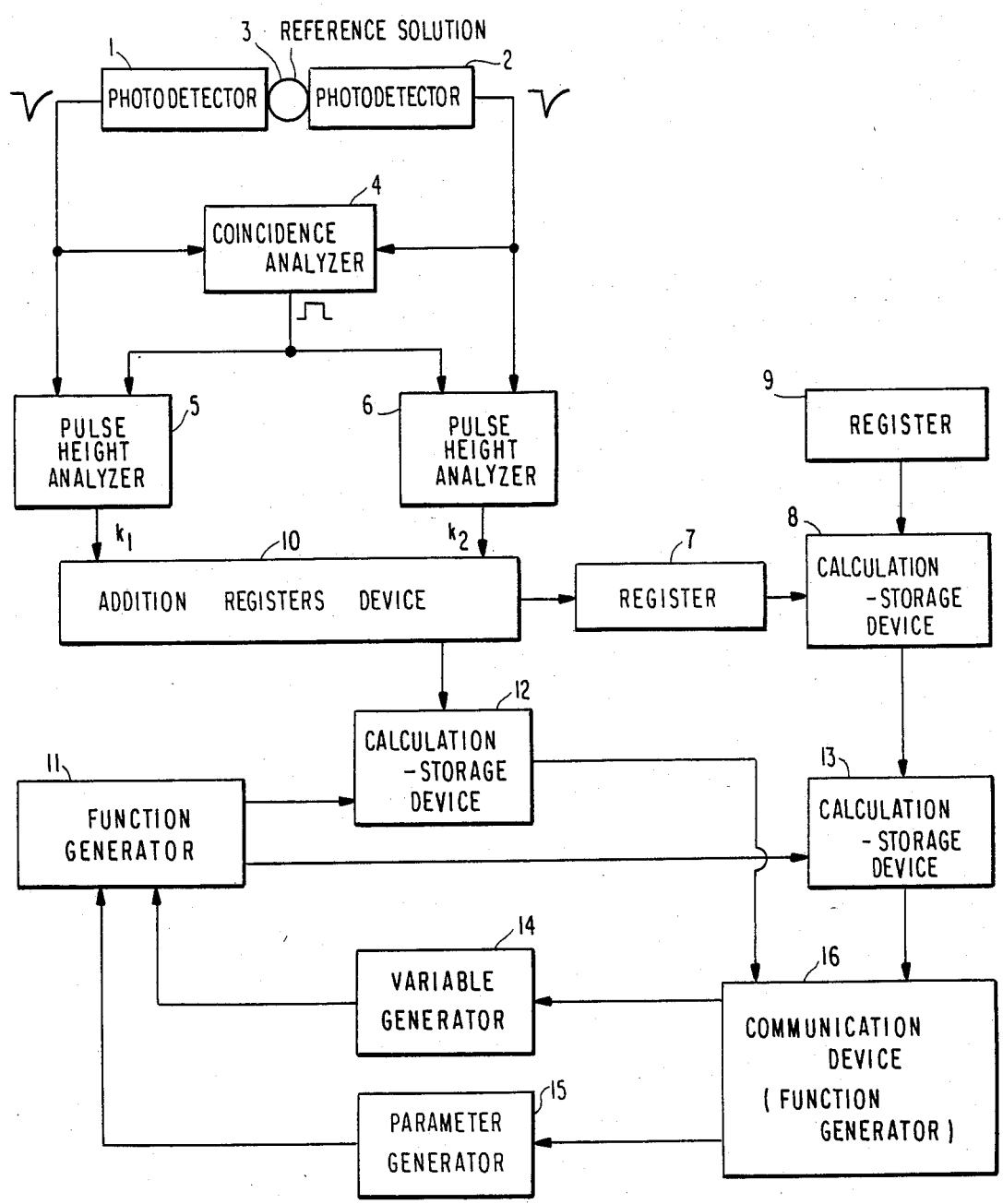

United States Patent [19]

Rundt et al.

[11] Patent Number: 4,652,751
[45] Date of Patent: Mar. 24, 1987

[54] METHOD FOR CALIBRATING LIQUID SCINTILLATION COUNTERS

[75] Inventors: Kenneth C. A. Rundt; Timo E. T. Oikari; Heikki K. J. Kouru, all of Turku, Finland

[73] Assignee: Wallac Oy, Turku, Finland

[21] Appl. No.: 692,890

[22] PCT Filed: May 11, 1984

[86] PCT No.: PCT/SE84/00176

§ 371 Date: Dec. 27, 1984

§ 102(e) Date: Dec. 27, 1984

[87] PCT Pub. No.: WO84/04600

PCT Pub. Date: Nov. 22, 1984

[30] Foreign Application Priority Data

May 13, 1983 [SE] Sweden .............................. 8302733

[51] Int. Cl.$^4$ .............................................. G01T 1/204
[52] U.S. Cl. ................................ 250/252.1; 250/328; 250/362
[58] Field of Search ...................... 250/252.1, 328, 362, 250/364, 369

[56] References Cited

U.S. PATENT DOCUMENTS

| | | | |
|---|---|---|---|
| 3,715,584 | 2/1973 | Rosenstingl | 250/362 |
| 3,780,289 | 12/1973 | Kulberg et al. | 250/362 |
| 3,899,673 | 8/1975 | Packard | 250/328 |
| 4,085,325 | 4/1978 | Atallah et al. | 250/328 |

FOREIGN PATENT DOCUMENTS 1335401 10/1973 United Kingdom .

Primary Examiner—Carolyn E. Fields
Attorney, Agent, or Firm—Fisher, Christen & Sabol

[57] ABSTRACT

Method for calibrating a liquid scintillation counter comprising, for a number of reference solutions containing isotopes of known decay rates, the counting of a number of coincident pulses caused in at least two photodetectors by photons produced by the decay of the isotopes within a first known time interval, for obtaining the scintillation pulse frequency of each reference solution and the calculating of the counting efficiency for each reference solution by dividing said scintillation pulse frequency by the known decay rate. According to the invention, it is, for each reference solution, at first measured within a second known time interval, which completely or partially can overlap the said first one, how many photoelectrons the photons in each coincident scintillation pulse have caused in at least one photodetector, whereafter a calibration vector comprising at least one unknown calibration parameter is determined by fitting a function based on theoretical grounds containing said calibration vector to said experimentally determined counting efficiency and by fitting a function based on theoretical grounds containing said calibration vector, to said measured photoelectron numbers.

5 Claims, 2 Drawing Figures

METHOD FOR CALIBRATING LIQUID SCINTILLATION COUNTERS

The invention comprises a method for calibrating liquid scintillation counters by using a number of reference solutions in which scintillation pulses, caused by photons liberated by the decay of isotopes, are registered by means of at least two photodetectors, cooperating so that only the pulses which are simultaneous in all the detectors within a certain interval, are counted and analyzed by means of pulse height analysers. Through the calibration, a number of calibration parameters are determined on basis of the pulse heights of the registered pulses and the counting efficiency determined for the reference samples. These parameters are specific for the liquid scintillation counter and for the scintillation solutions.

The aim of liquid scintillation counting (henceforth abbreviated LS counting) is to measure the amount of radioactive isotopes in a solution. This amount is directly proportional to the decay rate (the radioactivity). The method is used in different scientific research areas and can in principle be utilized to measure any radioactive isotope, but the largest group is definitely the $\beta$-radiating isotopes and in this group there are especially two isotopes (of common use): $^3H$ and $^{14}C$. Most commercial LS counters are built and the measuring programs are made for these two isotopes. Tritium ($^3H$) is the $\beta$-radiating isotope which has the lowest radiation energy and is for that reason critical to measure, as often only less than a half of all decays can be detected.

When a charged particle ($\beta$-electron) traverses a medium of aromatic molecules, it collides with the molecules of the medium and transfers part of its energy to the molecules in the form of excitation of their electrons. This excitation energy moves rapidly from one molecule to another until it is absorbed by a fluorescent molecule which emits a photon when it is de-excited. An electron having an initial energy of a few kilo electron Volts is able to excite and ionize a great number of solvent molecules before it is absorbed once and for all, but due to the low efficiency of the scintillation processes and the presence of many competitive processes only a few percent of the emitted energy is finally transformed to photons, while the rest is transformed to heat. Scintillation efficiency refers to a measure indicating how much of the energy having been absorbed in the form of excitation of the aromatic molecules, is finally transformed to energy in the form of photons.

As $\beta$-radiating isotopes give rise to $\beta$-electrons of different energies ($\beta$-electron distribution), and as the number of photons arising from a decay is proportional to the energy of the electron, scintillations containing different numbers of photons are obtained. In commercial LS counters the photons are registered by two photomultiplier tubes in coincidence, and as the heights of the registered pulses are proportional to the number of photons which reaches the photomultiplier tubes, a distribution of pulses of different pulse heights is obtained, i.e. a so-called pulse height distribution or spectrum.

Quenching is a phenomenon whereby the overall number of photons per decay is reduced, resulting in lower probability that a decay will be detected. There are mainly four types of quenching which affect directly the scintillation solution and two which affect the measuring systems.

Quenching in the solution:
(i) absorption quenching, which implies that part of the energy of the $\beta$-electron is absorbed by some inert material, such as tissues, filter paper or water droplets.

(ii) Dilution quenching, which implies that the $\beta$-electron excites and ionizes non-aromatic molecules. This is the case, if the solution contains large amounts of non-aromatic solvents.

(iii) excitation quenching (chemical quenching), which implies that the scintillation efficiency decreases due to the fact that the excitation energy is absorbed by molecules which neither transport the energy further nor fluoresce.

(iv) colour quenching, which means that photons are absorbed by colour molecules (dyes) in the solution.

Quenching outside the solution:
(v) optical quenching, which means that the photons are absorbed by some material in the scintillation vial or in the measuring chamber. Low quantum efficiency of the photodetectors can also be assigned to this type of quenching.

(vi) coincidence quenching, which means that the coincidence time is so short that pulses consisting of only a few photons are detected with low probability.

Quenching always means that the average number of photons in every pulse decreases, which implies that the counting efficiency $\epsilon$, which is equal to the average probability that a decay will be detected, decreases. In order to be able to use LS counting for quantitative measurements, methods for determining $\epsilon$ are required. Mainly, there are two automatic methods, with small variations, used in commercial counters: one of them utilizes the pulse height distribution of the isotope, the other one utilizes a pulse height distribution obtained by means of an external $\gamma$-radiating source. Both the methods are relative, secondary to their character, which means that the unknown analysis solution is compared to a series of references (standards) having known activities of the isotopes.

As quenching also means that the height of every detected pulse decreases, a relative measure of the degree of quenching (quench index) can be obtained by measuring this pulse height shift. A simple method for this, firstly introduced by Baillie[1] in 1960, is to divide the pulse height distribution into two parts: part A consists of pulses with pulse heights greater than $h_1$, part B consists of pulses with pulse heights smaller than $h_1$. In that case the relation between the number of pulses in the parts A and B is a sensitive measure of the pulse height shift. Another method for registering the pulse height shift is to determine the mean pulse height of the distribution according to the equation $$m = \frac{\sum_h h \cdot N(h)}{\sum_h N(h)} \qquad (1)$$

where $N(h)$ is the number of pulses of the height $h$.[2,3] The summing limits can be chosen rather freely.

If the activity of the solution is low it is less suitable to determine the quench index on the basis of the pulse height distribution of the isotope. In such a case an external $\gamma$-radiating source is utilized. When necessary, this source is brought near the solution, the $\gamma$-rays thus causing free electrons via Compton-scattering when a $\gamma$-quantum collides with an atom. A method based on the channels ratio for the pulse height distribution of the external γ-isotope was firstly suggested by Hayes[4]. Horrocks[5] has suggested as a quench index the use of the pulse height of the Compton-edge at half of the peak intensity. This method has been further developed by Horrocks[6] and is employed commercially by Beckman, Inc., USA. Instead of the channels ratio or the pulse height of the Compton edge, the mean pulse height according to the equation (1) can be used as a quench index.

The common problem for each method is the preparation of reference solutions. These must be of a sufficient number to cover a large quenching interval and should contain exactly the same known amount of activity, but different degrees of quenching. The reference solutions ought to be prepared in exactly the same way as the unknown analysis solutions and contain the same type of quenching.

To enable interpolation between the reference points and extra polation outside these points, some mathematical function, e.g. a polynomial or a chain polynomial ("spline"), is fitted to the reference points by using e.g. the least square method. If no additional information is available, the form of the curve is totally determined by the reference points. This fact leads to two problems: Firstly, two or three unsuccessful references can destroy large parts of the curve and secondly, extra polation outside the reference points is always uncertain to perform.

The above mentioned quenching indices are very dependent on instrument parameters and difficult to compare with each other. Quench functions made in one counter cannot be used in another counter without risk.

Except for the commonly used secondary methods described above, a number of attempts has been made to introduce absolute, primary calibration methods. None of these methods has however been of any practical importance due to the fact that the theoretical background has not been sound enough.

Horrocks and Studier[7] have suggested a method where the relations between the registered pulse frequency in a coincidence measurement and the total pulse frequency (also containing non-coincidence pulses, but not the thermal noise) were compared with theoretical values.

Gibson and Gale[8] have treated the LS process systematically starting from a statistic model for measuring systems consisting of only one photomultiplier tube. As to $\epsilon$ in this system they give a formula of the correspondence $$\epsilon = 1 - \int_0^{E_m} S(E) e^{-a \cdot L(E,b)} D(k) \, dE \quad (2)$$

where S(E) is the β-spectrum of the isotope according to Fermi, $E_m$ the maximum energy of the β-electron and a constant dependent on the scintillation efficiency of the solution and of the optical energy of the system, which reflects the quenching forms (iv) and (v) above. The function L(E,b) is proportional to the amount of energy being transferred to singlet- and triplet solvent states. This function which reflects the above mentioned quenching forms (i) and (ii) contains a constant b independent of the scintillation efficiency. The product a·L(E,b) equals the number of photoelectrons k which are produced on an average by a β-electron with the initial energy E. The function D(k) is only dependent on the dynode processes of the multiplier tubes and equals the probability that a pulse consisting of k photon electrons shall pass through the photomultiplier tube. This probability is in practice equal to one. Gibson's and Gale's model presupposes that the function L(E,b) and the constant b are known.

Kolarov et al[9] have combined and further developed Horrocks' and Studier's ideas and Gibson's and Gale's ideas. They give the following formula for the counting efficiency ($\epsilon$) for a system in coincidence:

$$\epsilon = \int_0^{E_m} S(E)(1 - e^{-a_1 \cdot L(E,b)})(1 - e^{-a_2 \cdot L(E,b)}) \, dE = \epsilon(a_1, a_2, b) \quad (3)$$

where $a_1$ and $a_2$ are two unknown constants which depend on the scintillation efficiency and on the quantum efficiency of the photomultiplier tube 1 and 2, respectively. For the total counting efficiency ($\epsilon_1$ or $\epsilon_2$) of one tube, independent of the other, the formula reads $$\epsilon_j = \int_0^{E_m} S(E)(1 - e^{-a_j \cdot L(E,b)}) \, dE \quad (j = 1,2) \quad (4)$$

By measuring the coincidence pulse frequency C and the total independent pulse frequency (the thermal noise subtracted) of each tube and by determining the relation $C/C_j = \epsilon/\epsilon_j$, the constants $a_j$ can be determined.

The equation (formula number 3) shows that the coincidence counting efficiency $\epsilon$ of an unknown scintillation solution can be determined theoretically provided that the function L(E,b), the parameter b and the variables $a_1$ and $a_2$ are known. In the ideal case of the parameter b is a constant for all scintillation solutions of a certain type and must only be determined once, through the calibration, while $a_1$ and $a_2$ have to be determined separately for each unknown analysis solution.

The invention described in this application comprises different methods for calibrating LS-counters by utilizing the pulse height distribution of the isotope, in order to be able to compensate for the quenching phenomena, in such a way that an arbitrary number of parameters, using pulse height analyzers of the type 6, in the equation (formula number 3) is determined. These parameters are henceforth called calibration parameters and denoted b, generally, meaning a vector consisting of m parameters $b_1 \ldots b_m$. The subject of the invention is obtained by the use of a method characterized substantially in that a function based on a theoretical model for the liquid scintillation phenomenon and containing the calibration parameters b, is fitted to some type of pulse height distribution for a number of reference solutions, so that all the calibration parameters of the function are determined.

Figure 2:
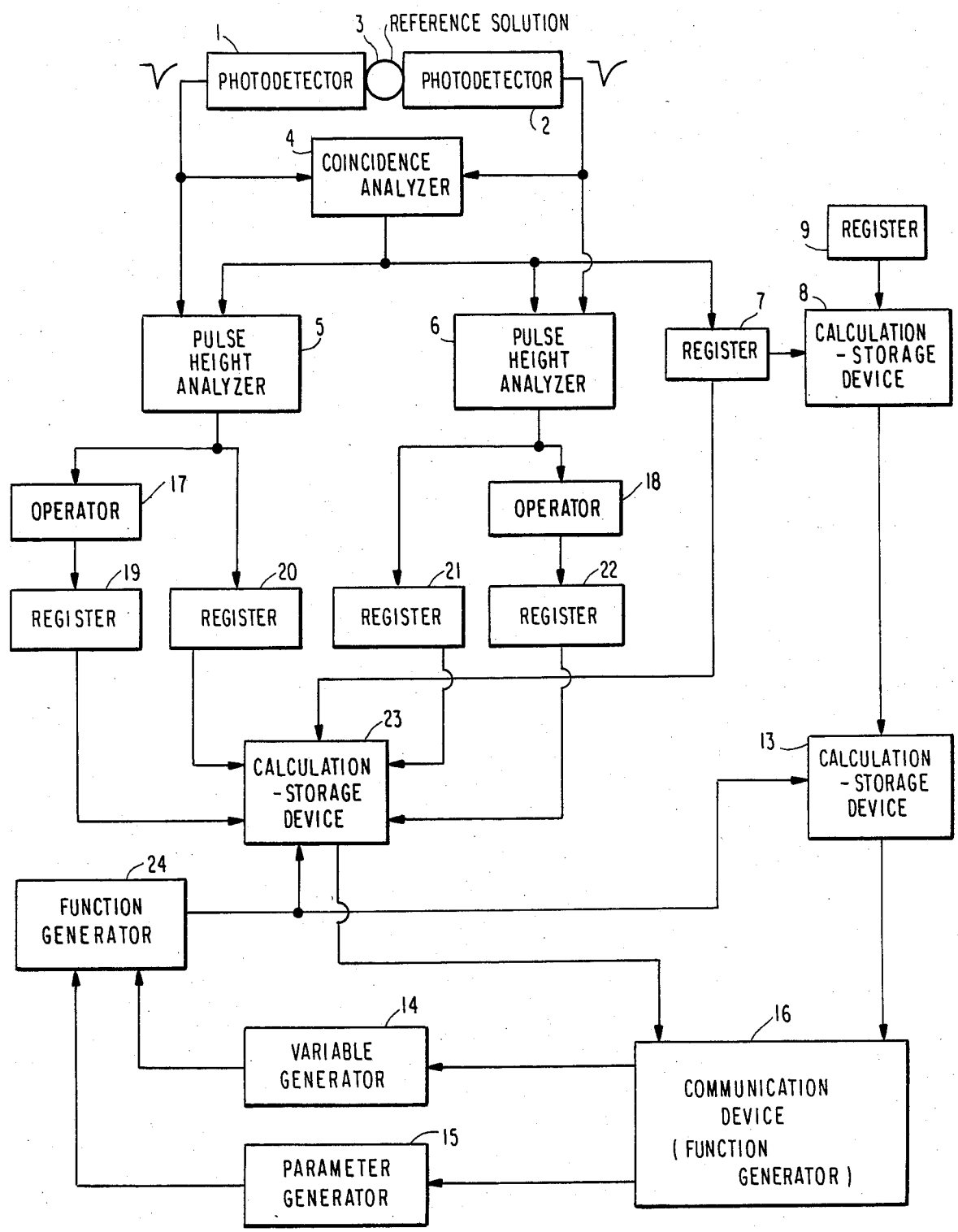

The invention will be described below with reference to the attached drawings on which FIG. 1 shows a first embodiment for carrying the method according to the invention into effect, and FIG. 2 shows a second embodiment thereof.

In order to explain the character and the scope of the invention it is necessary to consider in detail how the LS counter works and the theory behind.

On the basis of Poisson statistics, the probability that n photons are formed by a decay, is given by the expression $$P(n|a,b) = \int_0^{E_m} S(E) \frac{(a \cdot L(E,b))^n e^{-a \cdot L(E,b)}}{n!} dE \qquad (5)$$

where the variable a is equal to the scintillation efficiency. The parameter vector b contains m calibration parameters $b_1 \ldots b_m$, which quite generally can be assumed to be dependent on the type of scintillation solution as well as of its scintillation efficiency. In literature, at least four different functions are given for $L(E,b)$:

(i) Birks[10] has on an experimental basis suggested the formula $$L(E,b_1) = \int_0^E \frac{dE'}{1 + b_1(dE'/dx)} \qquad (6)$$

(ii) Chou[11] has suggested an extended form $$L(E,b_1,b_2) = \int_0^E \frac{dE'}{1 + b_1(dE'/dx) + b_2(dE'/dx)^2} \qquad (7)$$

(iii) Wright[12] has suggested the formula $$L(E,b_1) = \frac{1}{2b_1} \int_0^E \frac{\ln(1 + 2b_1(dE'/dx))}{(dE'/dx)} dE' \qquad (8)$$

Voltz et al[13] have suggested the formula $$L(E,b_1,b_2,b_3) = \int_0^E (e^{-b_1(dE'/dx)} + b_2 e^{-b_3(dE'/dx)}) dE' \qquad (9)$$

where the constant $b_2$ is dependent on the scintillation efficiency a. The function $L(E,b)$ can be extended to comprise parameters which are dependent on the scintillation efficiency as well as on the type of quenching. Absorption of part of the energy of the electron e.g. in the isotope carrying water phase of a microemulsion takes probably place at that moment when the electron leaves the isotope. With a rough approximation Birks' function (7) may then be written $$L(E,b_1,b_2) = \int_0^{E-b_2} \frac{dE'}{1 + b_1(dE'/dx)} \qquad (10)$$

Another rough approximation for absorption is $$L(E,b_1,b_2) = \int_0^E \frac{dE'}{1 + b_1(dE'/dx)} - b_2 \qquad (11)$$

In both these equations $b_2$ is dependent on the amount of water in the emulsion. Colour quenching can be treated with Birks' function written in the following way $$L(E,b_1,b_2) = \int_0^E \frac{dE'}{1 + (b_1 + b_2)(dE'/dx)} \qquad (12)$$

where $b_2$ depends on the absorbance of the scintillation solution.

At the calibration a suitable $L(E,b)$-function can be chosen on a purely experimental basis. Thus, one function can be more suitable to a certain type of scintillation solution than another function, but at the same time the number of calibration parameters should be kept low.

The photons formed at the decay of the radioactive isotope are detected in the measuring chamber consisting of f photodetectors ($FD_1 \ldots FD_2$) and of an optic device to guide the photons from the scintillation solution to the light sensitive surfaces of the detectors. The probability that a photon which is formed in a point with the coordinates r in the solution, will cause a detectable pulse in $FD_j$ is $p_j(r)$, henceforth abbreviated $p_j$. According to the multinomial theorem the probability for obtaining a pulse of the size $k_j$ in $FD_j$ if n photons are liberated from the solution, is thus given by the equation $$P(k_1 \ldots k_f | n, p_0 \ldots p_f) = \frac{n!}{\prod_{j=1}^{f} k_j! \cdot (n-k_0)!} \prod_{j=1}^{f} p_j^{k_j} \cdot p_0^{n-k} \qquad (13)$$

where $k = \sum_{j=1}^{f} k_j$ and $P_0 = 1 - \sum_{j=1}^{f} P_j$.

The equation implies that $k_j$ is proportional to the number of photons reaching the surface of the photodetector and that $k \leq n$. The reason for using more than one detector per measuring chamber is the improved signal noise-ratio which is obtained by having several detectors in coincidence with each other. In commercial LS-counters the photodetectors consist of photomultiplier tubes, and these are always two in number per detector chamber. In that case the equation (formula number 13) is simplified to (formula number 14)

$$P(k_1,k_2|n,p_1,p_2) = \frac{n!}{k_1! k_2! (n-k)!} p_1^{k_1} p_2^{k_2} p_0^{n-k} \qquad (14)$$

where $k_j$ is the number of photoelectrons in the photomultiplier tube j. The coincidence condition can be expressed in the following way: If the first photoelectron as a result of a decay, arises in FD at the time $t_1$ and the first photoelectron in $FD_2$ arises at a later time $t_2$, the pulse is accepted for further treatment only if $t_1 \leq t_2 \leq t_1 + t_c$, where $t_c$ is called the coincidence resolving time. The probability that a pulse consisting of $k_1$ and $k_2$ photoelectrons will be detected by the coincidence analyzer, is given by the equation $$P(k_1,k_2|t_c) = \qquad (15)$$

$$1 - \int_0^\infty \phi(t)(k_1 \theta(t)^{k_1-1} \theta(t+t_c)^{k_2} + k_2 \theta(t)^{k_2-1} \theta(t+t_c)^{k_1}) dt$$

where $\theta(t)$ is a function depending on the time function $\phi(t)$[14], the appearance of which is extremely complicated. The function $\theta(t)$ is given by $$\theta(t) = 1 - \int_0^t \phi(u) du \qquad (16)$$

If the equations (5), (14) and (15) are connected the probability to register a coincident scintillation pulse is obtained, the photons of which have arisen in a point r in the solution and caused $k_1$ photoelectrons in $FD_1$ and $k_2$ in $FD_2$:

$$P(k_1,k_2|a,b,p_1,p_2,t_c) = P(k_1,k_2|t_c) \cdot \sum_{n=k_1+k_2}^{\infty} P(n|a,b) \cdot P(k_1,k_2|n,p_1,p_2) \quad (17)$$

For the whole scintillation solution of volume V, the following is thus valid:

$$P(k_1,k_2|a,b,p_1,p_2,t_c) = P(k_1,k_2|t_c) \cdot \sum_{n=k_1+k_2}^{\infty} P(n|a,b) \cdot \int_V P(k_1,k_2|n,p_1,p_2)dr \quad (18)$$

In the equation (18) $p_1$ and $p_2$ refer to probabilities independent of the coordinate r that a photon will cause a detectable pulse in $FD_1$ and $FD_2$, respectively. The counting efficiency $\epsilon$ is obtained thereafter from the formula $$\epsilon(a,b,p_1,p_2,t_c) = \sum_{k_1=1}^{\infty} \sum_{k_2=1}^{\infty} P(k_1,k_2|a,b,p_1,p_2,t_c) \quad (19)$$

where all the combinations of $k_1$ and $k_2$ are included.

The functions pj are dependent on the volume of the solution, on the form and the material of the measuring vial, on the optical properties of the solution and the detector chamber and on the properties of the photodetectors. Because of this the functions pj can only be determined with great difficulty and to obtain the formulas (17) and (18) in such forms that they will be of practical importance, approximations are required. The simplest approximation is to assume that $P_j=p_j$, i.e. independent of the coordinate r, the integration over the volume V thus disappearing in the equation (18). As the measuring chamber is often totally symmetrical as regards the photodetectors and these are balanced against each other, it can well be assumed that $P_1=p_2=p/2$, where $p=p_1+p_2<1$. Finally, a new variable $a'=a\cdot p$, can be introduced, which might be called the efficiency of the system. In that case the formula 18 can be written:

$$P(k_1,k_2|a',b,t_c) = P(k_1,k_2|t_c) \cdot \sum_{n=k}^{\infty} P(n|a,b) \cdot P_1,k_2|n,p) =$$

$$P(k_1,k_2|t_c) \cdot \sum_{n=k}^{\infty} \int_0^{E_m} S(E) \frac{(aL(E,b)^n e^{-aL(E,b)}}{n!} \frac{n!}{k_1!k_2!(n-k)!} \left(\frac{p}{2}\right)^k (1-p) \, dE =$$

$$P(k_1,k_2|t_c) \frac{1}{k_1!k_2!} \int_0^{E_m} S(E) \, e^{-a'L(E,b)} \left(\frac{a'}{2} L(E,b)\right)^k dE \quad (20)$$

In this equation $P(k_1, k_2 \, t_c)$ is henceforth included as an unknown function. As the analytical expression of this function is of quite complicated character it is also in this case necessary to use approximations. The time function $\phi(t)$ of the fluorescence intensity consists of two parts; the prompt (fast) component which stems from excited singlets and the delayed (slow) component which stems from excited triplets[14]. In practice the coincidence time is so short ($\sim$20 ns) that only the prompt component contributes to $P(k_1, k_2 \, t_c)$. The time function of the fluorescence intensity for the prompt component is described with a good approximation by the exponential function $$\phi(t) = \tau \cdot e^{-t/\tau} \quad (21)$$

where $\tau$ is a time constant dependent on the scintillation solution. If equation (20) is inserted in (16) and (15) the following is obtained $$P(k_1,k_2|t_c/\tau) = 1 - \frac{k_1}{k} e^{-k_2 t_c/\tau} - \frac{k_2}{k} e^{-k_1 t_c/\tau} \quad (22)$$

where the relation $t_c/\tau$ is a new parameter.

The above can be concluded in the following way:
There exists an expression based on theoretical grounds $$P(k_1,k_2|\text{teo.}) = P(k_1,k_2|a,b,p_1,p_2,t_c) \quad (23)$$

for the probability when an isotope decays in a scintillation solution to detect with two photodetectors 1 and 2, a pulse consisting of $k_1$ photoelectrons in detector 1 and $k_2$ photoelectrons in detector 2, and this expression is a function of the scintillation efficiency a, m calibration parameters $b=(b_1 \ldots b_m)$, two constants $p_1$ and $p_2$, which depend on the optical properties of the detector chamber and the quanta efficiencies of the detectors, and a constant $t_c$, which depends on the coincidence analyzer of the counter.

There also exists an expression based on theoretical grounds for the counting efficiency of a scintillation solution:

$$\epsilon(\text{teo.}) = \epsilon(a,b,p_1,p_2,t_c) = \sum_{k_1=1}^{\infty} \sum_{k_2=1}^{\infty} P(k_1,k_2|a,b,p_1,p_2,t_c) \quad (24)$$

and also this expression is a function of the efficiency a, the parameters b and the constants $p_1$, $p_2$ and $t_c$.

If the apparatus depending constants $p_1$, $p_2$ and $t_c$ and the parameters b are known, the counting efficiency $\epsilon$ of an analysis solution of unknown activity can be determined by means of measuring some quantity based on equation (23) which gives the possibility to determine the variable a for the solution in question. The parameters b are determined by calibration of the counter, which can be performed in several different ways. The calibration methods described below imply that for each isotope for which calibration is to be carried out, a calibration series has been prepared consisting of a limited number of scintillation solutions containing known amounts of the isotope in question. These solutions are henceforth called reference solutions. Quite generally the calibration method can be described in the following way:

For each reference solution containing an isotope having the decay rate A, the following measures are taken:

1. Determine the total number of coincident scintillation pulses, N, during the measuring interval $t_a$. Thereafter, calculate the counting efficiency according to the formula $$\epsilon(\text{exp.}) = C/A = N/(t_a A) \quad (25)$$

where C refers to the frequency of total coincident scintillation pulses.

2. Determine the number of coincident scintillation pulses consisting of $k_1$ and $k_2$ photoelectrons, $N(k_1, k_2|\text{exp.})$, during the measuring interval $t_b$. $N(k_1, k_2|\text{exp.})$ are henceforth called the experimental pulse height distribution.

For each reference solution and for the whole series of solutions the following measures are taken:

3. Determine the variable a and the calibration parameters b by fitting on the one hand the theoretical probability distribution $P(k_1,k_2|\text{teo.})$ to the experimental pulse height distribution and on the other hand the theoretical counting efficiency $\epsilon(\text{teo.})$ to the experimental, so that the following criteria are fulfilled:

a. For each reference solution $P(k_1, k_2|\text{teo.})$ ought to differ from $N(k_1, k_2|\text{exp.})$ as little as possible. This can be obtained for example by minimizing S, which is equal to the sum of squared residuals and given by $$S = \sum_{k_1=1}^{\infty} \sum_{k_2=1}^{\infty} (d_1 \cdot N(k_1,k_2|\text{exp}) - d_2 \cdot P(k_1,k_2|\text{teo.}))^2 \quad (26)$$

where $d_1$ and $d_2$ are suitably chosen constants.

b. For each reference solution the theoretical counting efficiency $\epsilon(\text{teo.})$ ought to differ from the experimental $\epsilon(\text{exp.})$ as little as possible taking consideration of the expected error in $\epsilon(\text{exp.})$. The optimizing can for example take place by minimizing squared relative difference D;

$$D = \left[ \frac{\epsilon(\text{exp.}) - \epsilon(\text{teo.})}{\epsilon(\text{exp.})} \right]^2 \quad (27)$$

c. For the whole series of reference solutions the variable a ought to be a continuous, unambigous function of $\epsilon(\text{exp})$ without extreme values. Otherwise, the optimizing of a and b must be carried out again for all the reference solutions or only for the solutions which clearly differ from the rest.

d. For the whole series of reference solution the parameters b ought to be constants or unambiguous functions of a. Otherwise, the optimizing of a and b must be carried out again for all the reference solutions or only for the solutions which clearly differ from the rest.

The calibration can be carried out with an LS counter, designed according to FIG. 1. In FIG. 1 reference numerals 1 and 2 denote two photodetectors, reference numeral 3 a reference solution, reference numeral 4 a coincidence analyzer, reference numeral 10 a device containing a number of addition registers for the two-dimensional pulse height distribution $N(k_1, k_2|\text{exp.})$, reference numeral 7 a register for the total coincidence pulse frequency measured during the measuring interval $t_a$, reference numeral 9 a register containing the decay rate A of the isotope, 8 a device for calculating and storing the counting efficiency obtained in the reference solution3, reference numeral 11 a function generator which generates $\epsilon(\text{teo.})$ and $P(k_1,k_2|\text{teo.})$, 12 a device for calculating and storing S, or some other measure indicating how well $P(k_1, k_2|\text{teo.})$ corresponds to $N(k_1, k_2|\text{exp.})$, reference numeral 13 a device for calculating and storing D, or some other measure indicating how well $\epsilon(\text{teo.})$ corresponds to $\epsilon(\text{exp.})$, reference numeral 14 a generator for the variable a, reference numeral 15 a group of generators for the parameter vector b and 16 a device for communication between the counter and the operator.

From each photodetector 1 and 2 the pulses which are proportional to the number of photoelectrons $k_1$ and $k_2$, respectively, produced in the photodetectors as a result of a scintillation in the solution 3, move on to a coincidence analyzer 4, the coincidence resolving time of which is $t_c$, and to two pulse height analyzers 5 and 6, respectively, which analyse the pulses only if the coincidence analyzer accepts them. The output signals from the pulse height analyzers address a certain register in the device 10 and increases the contents to this register by one for each coincident pulse. In the device 10 the pulse height distribution $N(k_1, k_2|\text{exp.})$ is present in matrix form at the end of the measuring interval $t_b$. The total pulse frequency C, which is calculated and stored in register 7, can be determined by measuring the total pulse amount N during a first time interval $t_a$, whereafter C equals the quotient $N/t_a$. Alternatively, C may be calculated from the pulse height distribution $N(k_1, k_2|\text{exp.})$ stored in the device 10 by utilizing the relation $$C = \frac{1}{t_b} \sum_{k_1=1}^{\infty} \sum_{k_2=1}^{\infty} N(k_1,k_2|\text{exp}) \quad (28)$$

After C having been determined, $\epsilon(\text{exp.})$ can be calculated and stored in register 8 according to the formula (25). After having calculated $\epsilon(\text{exp.})$ as well as determined $N(k_1, k_2|\text{exp.})$, the parameters b may be determined according to the following method:

The function generator 11 generates a value for $\epsilon(\text{teo.})$ and values for $P(k_1,k_2|\text{teor.})$ for each combination of $k_1$ and $k_2$ with experimental correspondence in the device 10. The values produced by the generator depend on the apparatus constants $p_1$, $p_2$ and $t_c$, which are built-in in the generator and on the variable a and the parameter vector b, the values of which are given by the generators 14 and 15. By means of some optimizing method, well known in mathematical analysis, the operator can by steering the generators 14 and 15 search the values of a and b which satisfy the criteria given under point 3 above. From the criteria in points 3.c and 3.d it is obvious that the capacity of the devices 10 and 8 ought to be enough for storing complete measuring data for all the reference solutions until the calibration has been successfully carried out.

The above way of determining the calibration parameters b can be simplified or varied in several different ways:

(i) Only the scintillation pulses from one of the photodetectors are analyzed with regard to pulse height for obtaining a pulse height distribution. Denote this photodetector 1. Then the following equation is valid:

$$P(k_1|a,b,p_1,p_2,t_c) = \sum_{n=k_1+1}^{\infty} P(n|a,b) \cdot \quad (29)$$

-continued
$$\sum_{k_2=1}^{n-k_1} P(k_1,k_2|n,p_1,p_2) \cdot P(k_1,k_2|t_c)$$

In this mode the pulse height analyzer 6 disappears from FIG. 1, while the device 10 now consists of a number of registers for storing for each reference sample, the vector $N(k_1|\exp.)$. The residual sum S is now given by $$S = \sum_{k_1=1}^{\infty} (d_1 \cdot N(k_1|\exp.) - d_2 \cdot P(k_1|\text{teo.}))^2 \quad (30)$$

(ii) The pulses from the two tubes are summed in order to obtain a pulse height distribution. The summation can take place either before or after the pulse height analysis. In this case the following equation is valid, where k refers to the sum $k_1$ $$P(k|a,b,p_1,p_2,t_c) = \sum_{n=k}^{\infty} P(n|a,b) \cdot \quad (31)$$

$$\sum_{\substack{k_1=1\\k_2=k-k_1}}^{\infty} P(k_1,k_2|n,p_1,p_2) \cdot P(k_1,k_2|t_c)$$

In this mode the device 10 in FIG. 1 consists of a number of registers to store the vector $N(k|\exp.)$ for each reference solution. The residual sum is given from an expression analogue to (30) with k instead of $k_1$.

(iii) Only the smaller 15 of the two pulses $k_1$ and $k_2$ is used to obtain a pulse height distribution. The choice between $k_1$ and $k_2$ can take place either before or after the pulse height analysis. In this case the equation (32) is valid $$P(k|a,b,p_1,p_2,t_c) = \sum_{n=2k}^{\infty} P(n|a,b) \cdot \quad (32)$$

$$(2 \cdot \sum_{\substack{k_1=k\\k_2=k+1}} P(k_1,k_2|n,p_1,p_2) \cdot P(k_1,k_2|t_c) +$$

$$P(k,k|n,p_1,p_2) \cdot P(k,k|t_c)$$

where k refers to the smaller one of $k_1$ and $k_2$. In this mode the device 10 in FIG. 1 consists of a number of registers to store the vectors $N(k|\exp.)$ for each reference solution. The residual sum S is thereafter obtained according to the equation (30), but with k instead of $k_1$.

(iv) The product of the two pulses $k_1$ and $k_2$ is utilized for determining the pulse height distribution. If the product $k_1 \cdot k_2$ is denoted k the following formula is valid $$P(k|a,b,p_1,p_2|t_c) = \sum_{n=k}^{\infty} P(n|a,b) \cdot \quad (33)$$

$$\sum_{k_1}\sum_{k_2} P(k_1,k_2|n,p_1,p_2) \cdot P(k_1,k_2|t_c)$$

where the summations over $k_1$ and $k_2$ are chosen so that $k_1 \cdot k_2 = k$. In this mode the device 10 in FIG. 1 consists of a number of registers to store the vector $N(k|\exp.)$ for each reference solution. The residual sum S is thereafter obtained according to the equation (31), but with k instead of $k_1$.

All the equations (29), (31), (32) and (33) can under different assumptions be simplified and reduced in a corresponding way as the equation (18). In all the variants (i)–(iv) the remaining procedure is as is points 1–3 above.

Instead of fitting theoretical expressions of the types (18), (29), (31), (32) and (33), or simplified, reduced forms of them to the experimental pulse height distribution, the information included in the distribution for each reference solution, can be reduced to a smaller number of quantities determined on the basis of the distribution. Examples of such quantities are the moments about the origin. It is generally valid that for a distribution function F(k), where k is a stochastic variable which can accept all discrete values $\geq 1$, the moments of the degree r about the origin are given by $$m^r = \frac{\sum_{k=1}^{\infty} k^r \cdot F(k)}{\sum_{k=1}^{\infty} F(k)} \quad (34)$$

For a two-dimensional distribution function $F(k_1, k_2)$ where $k_1$ and $k_2$ are stochastic variables independent of each other, accepting all discrete values $\geq 1$, the moments of the degree r about the origin for the variable $k_j$ are given by $$m_j^r = \frac{\sum_{k_1=1}^{\infty}\sum_{k_2=1}^{\infty} k_j^r \cdot F(k_1,k_2)}{\sum_{k_1=1}^{\infty}\sum_{k_2=1}^{\infty} F(k_1,k_2)} \quad j=1,2 \quad (35)$$

The moments for the distribution $N(k_1,k_2|\exp.)$ are obtained by substituting $N(k_1, k_2|\exp.)$ for $F(k_1, k_2)$ in the equation (35). These moments are henceforth denoted $m_1^r(\exp.)$ and $m_2^r(\exp.)$. Likewise, the theoretical moments are obtained by substituting $P(k_1, k_2|\text{teo.})$ for $F(k_1, k_2)$. These moments are henceforth denoted $m_1^r(\text{teo.})$ and $m_2^r(\text{teo.})$. To carry out the calibration the total pulse frequency C for each reference sample and the pulse height distribution $N(k_1,k_2|\exp.)$ are registered, whereafter the counting efficiency $\epsilon(\exp.)$ and the moments $m_1^r(\exp.)$ and $m_2^r(\exp.)$ are determined. Thereafter the theoretical moments are fitted to the experimental ones, so that the e.g. the quantity $$S^r = (m_1^r(\exp.) - m_1^r(\text{teo.}))^2 + (m_2^r(\exp.) - m_2^r(\text{teo.}))^2 \quad (36)$$

is minimized and $\epsilon(\text{teo.})$ to $\epsilon(\exp.)$ so that the squared difference D according to the equation (27) is minimized.

To obtain the experimental moments and to fit the theoretical moments to these, so that the calibration parameters b are determined, an LS counter can be utilized, the design of which is analogue to the one shown in FIG. 1. In that case, reference numeral 12 comprises a device for first determining the moments about the origin on basis of the experimental pulse height distributions stored in device 10 and thereafter determining and storing the square sum $S^r$. The function generator 16 produces in this mode values for the moments desired and for the experimental counting efficiency outgoing from the built-in constants $p_1$, $p_2$ and $t_c$ and the values of the variable a and the parameters b.

Alternatively, the LS counter may be designed as in FIG. 2. In FIG. 2, reference numerals 1 and 2 denote two photodetectors, reference numeral 3 a reference solution, reference numeral 4 a coincidence analyzer, reference numerals 5 and 6 two pulse height analyzers, reference numerals 17 and 18 operators which raise the output signal of the pulse height analyzers to a desired power, reference numerals 19, 20, 21 and 22 four addition registers where the moments are formed, 7 a register for the total coincidence pulse frequency C, 9 a register containing the decay rate A, 8 a device for calculating and storing the determined counting efficiency, 24 a function generator which produces values for the theoretical moments and for the theoretical counting efficiency, 23 a device where $S^r$ or some other quantity which describes how well the theoretical moments correspond to the experimental ones, are calculated and stored, 13 a device where D or some other quantity which describes how well the theoretical counting efficiency corresponds to the experimental is calculated and stored, 14 a generator for the variable a, 15 a group of generators for the parameters b and 16 a device for communication between the counter and the operator.

In this example, the first moment $m_j^1$ (=the mean pulse height) is formed by adding the output signal from the pulse height analyzers 5 and 6 directly to the contents of the registers 20 and 21, respectively. At the end of the measuring interval $t_b$ the sums (37) are then found in the registers 20 and 21

$$T_j^1 = \sum_{k_2=1}^{\infty} \sum_{k_1=1}^{\infty} k_j N(k_j) \quad j = 1,2 \tag{37}$$

whereafter the first moments are obtained according to the formula $$m_j^1(\exp) = \frac{T_j^1}{N} \tag{38}$$

In a corresponding way the moments $m_j^r$ are formed as the output signal from the pulse height analyzers raised to the power r by the operators 17 and 18, respectively, is added to the registers 19 and 21, respectively, these sums finally being divided by N. The device 24 produces values for the moments $m_j^k$(teo.) and for the counting efficiency $\epsilon$(exp.). The variable a and the parameters b which guide the function generator 24 are chosen so that the theoretical model differs as little as possible from the experimental results.

Instead of carrying out the calibration by the use of quantities determined on the basis of the pulse height distributions of the two detectors, one of the following alternatives may be employed:

(i) Only the scintillation pulses of one of the photodetectors are used for determining the quantity in question. If in FIG. 2 only the pulses from the detector 1 are pulse height analyzed the devices 6, 18, 21 and 22 disappear in the diagram.

(ii) The sume of the two pulses $k_1$ and $k_2$ are used for determining the quantities in question. Summation can take place either before or after pulse height analysis.

(iii) Only the smaller[15] one of the two pulses $k_1$ and $k_2$ is used for determining the quantities in question. The choice between $k_1$ and $k_2$ can take place either before or after the pulse height analysis.

(iv) The product of the two pulses $k_1$ and $k_2$ is used for determining the quantities in question. The product can be formed either before or after the pulse height analysis.

It is essential for all the methods for calibrating LS counters embodied by this patent application that the photodetectors have been calibrated in such a way that it is known how many photoelectrons an arbitrary pulse is equivalent to. If the real number of photoelectrons produced in the light sensitive surface of the photodetector is $k_j$ and the registered pulse height on some arbitrary scale is $h_j$, thus the following is valid $$h_j = q_j \cdot k_j \tag{39}$$

where $q_j$ is an apparatus dependent constant which has to be determined experimentally for each photo-detector.

1. Baillie, L. A., International Journal of Applied Radiation and Isotopes, 8, (1960) 1.
2. Jordan, P., Nuclear Instruments and Methods, 97 (1971) 107.
3. Ring, J. G., Nguyen, D. C. and Everett, L. J., in "Liquid Scintillation Counting; Recent Applications and Development", Red. Peng, C.-T., Horrocks, D. L., and Alpen, E. L., Academic Press, 1980, Vol. 1 pp 89–104.
4. Hayes, F. N., in "Advances in Tracer Methodology", 3 (1966)95.
5. Horrocks, D. L., Nature, 202 (1964) 78.
6. Horrocks, D. L., U.S. Pat. No. 4,075,480, 1978.
7. Horrocks, D. L. and Studier, M. H., Analytical Chemistry, 33 (1961) 615.
8. Gibson, J. A. B. and Gale, H. J., Journal of Scientific Instruments (Journal of Physics E), 1 (1968) 99.
9. Kolarov, V., LeGallic, Y. and Vatin, R., International Journal of Applied Radiation and Isotopes, 21 (1970) 443.
10. Birks, J. B., Proceedings of the Physical Society, A64 (1951) 874.
11. Chou, C. N., Physics Review, 87 (1952) 904.
12. Wright, G. T., Physics Review, 91 (1953) 1282.
13. Voltz, R., Lopes de Silva, J., Laustriat, G. and Coche, A., Journal of Chemical Physics, 45 (1966) 3306.
14. Voltz, R. and Laustriat, G., Le Journal de Physique, 29 (1968) 159.
15. Laney, B. H., in "Liquid Scintillation Counting: Recent Developments", Red Stanley, P. E. and Scoggins, B. A., Academic Press, New York, 1974, pp 455–464.

We claim:

1. Method for calibrating a liquid scintillation counter comprising, for a number of reference solutions containing isotopes of known decay rates, the counting of a number of coincident pulses caused in at least two photodetectors by photons produced by the decay of the isotopes within a first known time interval, for obtaining the scintillation pulse frequency of each reference solution and the calculating of the counting efficiency for each reference solution by dividing said scintillation pulse frequency by the known decay rate, so as to provide an experimentally determined counting efficiency, characterized in that for each reference solution it is at first measured within a second known time interval, which completely or partially can overlap said first known time interval, how many photoelectrons the photons in each coincident scintillation pulse have caused in at least one photodetector whereafter a calibration vector comprising at least one unknown calibration parameter is determined by fitting a function based on theoretical grounds containing said calibration vector to said experimentally determined counting efficiency and by fitting a function based on theoretical grounds containing said calibration vector, to measured photoelectron numbers.

2. Method according to claim 1, characterized in that for each reference solution the function based on theoretical grounds is fitted to said measured photoelectron numbers by first determining an experimental photoelectron number distribution, comprising the frequency of pulses consisting of fixed numbers of photoelectrons measured in at least one photodetector during the second time interval, and thereafter fitting a function based on theoretical grounds and containing said calibration vector, to the said experimental photoelectron number distribution.

3. Method according to claim 2 characterized in that it is at first determined on basis of the experimental photoelectron number distribution, the value of at least one quantity depending on and describing the distribution and thereafter a function based on theoretical grounds and containing said calibration vector is fitted to the experimentally determined quantity.

4. Method according to claim 1, characterized in that for each reference solution the function based on theoretical grounds is fitted to said measured photoelectron numbers by first determining the value of at least one quantity depending on and describing said measured photoelectron numbers and thereafter fitting a function based on theoretical grounds and containing said calibration vector, to said experimentally determined counting efficiency.

5. Method according to one of the claims 3 or 4 characterized in that the mentioned quantities either comprise an equivalence to mathematical concepts which give a moment, having an origin point, of an arbitray function of an arbitrary degree about the origin point or combinations of these moments.

* * * * *